United States Patent
Kim

(10) Patent No.: US 9,243,385 B2
(45) Date of Patent: Jan. 26, 2016

(54) HYDRAULIC SYSTEM FOR CONSTRUCTION MACHINERY

(75) Inventor: Jeung Hwa Kim, Gyeonggi-do (KR)

(73) Assignee: Doosan Infracore Co., Ltd., Incheon (KR)

( * ) Notice: Subject to any disclaimer, the term of this patent is extended or adjusted under 35 U.S.C. 154(b) by 794 days.

(21) Appl. No.: 13/516,520

(22) PCT Filed: Nov. 3, 2010

(86) PCT No.: PCT/KR2010/007709
§ 371 (c)(1), (2), (4) Date: Jun. 15, 2012

(87) PCT Pub. No.: WO2011/074781
PCT Pub. Date: Jun. 23, 2011

(65) Prior Publication Data
US 2012/0261010 A1 Oct. 18, 2012

(30) Foreign Application Priority Data
Dec. 17, 2009 (KR) .......... 10-2009-0126081

(51) Int. Cl.
*F16D 31/02* (2006.01)
*E02F 9/22* (2006.01)
(Continued)

(52) U.S. Cl.
CPC .............. *E02F 9/2242* (2013.01); *B62D 5/065* (2013.01); *B62D 5/07* (2013.01); *E02F 9/207* (2013.01);
(Continued)

(58) Field of Classification Search
CPC ....... F15B 11/162; F15B 11/161; F15B 11/17
USPC ................................ 60/421, 422, 488
See application file for complete search history.

(56) References Cited

U.S. PATENT DOCUMENTS

| | | | | |
|---|---|---|---|---|
| 4,453,451 A | * | 6/1984 | Streeter et al. | 91/28 |
| 5,845,494 A | * | 12/1998 | Nishizawa et al. | 60/403 |
| 6,176,083 B1 | * | 1/2001 | Ikari | 60/422 |

FOREIGN PATENT DOCUMENTS

| | | |
|---|---|---|
| KR | 10-2004-0050562 A | 6/2004 |
| KR | 10-2005-0066004 A | 6/2005 |

(Continued)

OTHER PUBLICATIONS

Search Report dated Jul. 27, 2011 written in Korean for International Application No. PCT/KR2010/007709, filed Nov. 3, 2010, 3 pages.

*Primary Examiner* — Edward Look
*Assistant Examiner* — Daniel Collins
(74) *Attorney, Agent, or Firm* — John D. Veldhuis-Kroeze; Westman, Champlin & Koehler, P.A.

(57) ABSTRACT

The present disclosure relates to a hydraulic system for construction machinery, which is applied to construction machinery provided with a steering unit for controlling steering of equipment, and a main control valve for controlling operating of a work tool, and includes: a main pump for discharging working fluid supplied to the steering unit and the main control valve; a load sensing pressure sensor for sensing a load sensing pressure of the steering unit; a priority valve installed in a supply passage for the working fluid discharged from the main pump, for dividing and supplying the working fluid discharged from the main pump to the steering unit and the main control valve, to correspond to the load sensing pressure; an auxiliary pump for supplementing working fluid to the supply passage supplying the working fluid divided by the priority valve to the steering unit; an electric motor for operating the auxiliary pump; and a controller for operating the electric motor when the load sensing pressure is greater than a reference load sensing pressure, and additionally supplying working fluid discharged from the auxiliary pump the steering unit.

8 Claims, 4 Drawing Sheets

(51) Int. Cl.
  *B62D 5/065* (2006.01)
  *B62D 5/07* (2006.01)
  *E02F 9/20* (2006.01)
  *F15B 11/16* (2006.01)
(52) U.S. Cl.
  CPC ............... *E02F 9/2087* (2013.01); *E02F 9/225* (2013.01); *F15B 11/162* (2013.01); *F15B 2211/20515* (2013.01); *F15B 2211/20523* (2013.01); *F15B 2211/20576* (2013.01); *F15B 2211/2658* (2013.01); *F15B 2211/6309* (2013.01); *F15B 2211/6313* (2013.01); *Y10T 137/86002* (2015.04)

(56) References Cited

FOREIGN PATENT DOCUMENTS

| KR | 10-0627950 | B1 | 9/2006 |
| KR | 10-2009-0070522 | A | 7/2009 |

\* cited by examiner

HYDRAULIC SYSTEM FOR CONSTRUCTION MACHINERY

This Application is a Section 371 National Stage Application of International Application No. PCT/KR2010/007709, filed Nov. 3, 2010 and published, not in English, as WO2011/074781 on June 23, 2011.

FIELD OF THE DISCLOSURE

The present disclosure relates to construction machinery such as a wheel loader, and particularly, to a hydraulic system for construction machinery that uses working fluid discharged from one hydraulic pump to operate a work tool and a steering unit.

BACKGROUND OF THE DISCLOSURE

In general, construction machinery such as a wheel loader uses working fluid discharged from a hydraulic pump connected directly to an engine to operate a steering unit and a work tool. In particular, hydraulic systems that supply working fluid discharged from one hydraulic pump simultaneously to a steering unit and a work tool are currently in use. In such hydraulic systems, working fluid supplied to a steering unit and a work tool should be efficiently distributed, and an example of such distribution is shown in FIG. 1.

Referring to FIG. 1, working fluid discharged from a hydraulic pump 1 passes through a priority valve 2 and is supplied to a steering unit 3 and a main control valve 4. The working fluid supplied to the main control valve 4 is controlled in flow direction and supplied to an actuator of a work tool. The priority valve 2 is set to supply working fluid to the steering unit 3 first, and when a load sensing pressure (LS) of the steering unit 3 becomes low, the flow supplied to the main control valve 4 is increased and the flow of working fluid supplied to the steering unit 3 is reduced.

However, even when working fluid is first supplied to the steering unit 3 as described above, because an absolute flow of working fluid discharged from the hydraulic pump 1 is deficient when engine rpm is in a low range, the flow of working fluid supplied to the steering unit 3 is reduced. As a result, much effort is required to control the steering wheel, causing much difficulty in controlling the steering wheel.

The discussion above is merely provided for general background information and is not intended to be used as an aid in determining the scope of the claimed subject matter.

SUMMARY

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Accordingly, the present disclosure has been made in an effort to provide a hydraulic system for construction machinery that can make steering wheel control easy even when engine rpm is in a low range.

In order to achieve the above object, an exemplary embodiment of the present disclosure provides a hydraulic system for construction machinery having a steering unit 20 for controlling steering of equipment, and a main control valve 30 for controlling operating of a work tool, the hydraulic system including: a main pump 10 for discharging working fluid supplied to the steering unit 20 and the main control valve 30; a load sensing pressure sensor 60 for sensing a load sensing pressure of the steering unit 20; a priority valve 22 installed in a supply passage for the working fluid discharged from the main pump 10, for dividing and supplying the working fluid discharged from the main pump 10 to the steering unit 20 and the main control valve 30, to correspond to the load sensing pressure; an auxiliary pump 40 for supplementing working fluid to the supply passage supplying the working fluid divided by the priority valve 22 to the steering unit 20; an electric motor 50 for operating the auxiliary pump 40; and a controller 80 for operating the electric motor 50 when the load sensing pressure is greater than a reference load sensing pressure, and additionally supplying working fluid discharged from the auxiliary pump 40 to the steering unit 20.

According to an exemplary embodiment of the present disclosure, the hydraulic system may further include a supply pressure sensor 70 for sensing a supplied pressure that is a pressure of working fluid discharged from the main pump 10 and supplied to the steering unit 20, wherein the controller 80 may operate the electric motor 50 when the load sensing pressure is greater than a reference load sensing pressure, and the supplied pressure is less than a preset first reference pressure.

Also, the controller 80 may stop operation of the electric motor 50, when a supplied pressure PP sensed by the supply pressure sensor 70 exceeds a second reference pressure that is greater than the first reference pressure.

According to another exemplary embodiment of the present disclosure, the hydraulic system may further include a supply flow sensor 70 for sensing a supplied flow that is a flow of working fluid discharged from the main pump 10 and supplied to the steering unit 20, wherein the controller 80 may operate the electric motor 50 when the load sensing pressure is greater than a reference load sensing pressure, and the supplied flow is less than a preset first reference flow.

Further, the controller 80 may stop operation of the electric motor 50, when a supplied flow sensed by the supply flow sensor 70 exceeds a second reference flow that is greater than the first reference flow.

Another exemplary embodiment of the present disclosure provides a hydraulic system for construction machinery, supplying working fluid discharged from a main pump 10 to a steering unit 20 and a main control valve 30, the hydraulic system including: an auxiliary pump 40 for supplementing working fluid to the steering unit 20; an electric motor 50 for operating the auxiliary pump 40; a load sensing pressure sensor 60 for sensing a load sensing pressure PLS of the steering unit 20; a supply pressure sensor 70 for sensing pressure of working fluid discharged from the main pump 10 and supplied to the steering unit 20; and a controller 80 for operating the electric motor 50 such that the auxiliary pump 40 supplements working fluid to the steering unit 20, when the load sensing pressure PLS sensed by the load sensing pressure sensor 60 is greater than a reference load sensing pressure, and a supplied pressure PP sensed by the supply pressure sensor 70 is less than a first reference pressure.

Yet another exemplary embodiment of the present disclosure provides a hydraulic system for construction machinery, for supplying working fluid discharged from a main pump 10 to a steering unit 20 and a main control valve 30, the hydraulic system including: an auxiliary pump 40 for supplementing working fluid to the steering unit 20; an electric motor 50 for operating the auxiliary pump 40; a load sensing pressure sensor 60 for sensing a load sensing pressure PLS of the steering unit 20; a supply flow sensor 70 for sensing a flow of working fluid discharged from the main pump 10 and supplied to the steering unit 20; and a controller 80 for operating the electric motor 50 such that the auxiliary pump 40 supplements working fluid to the steering unit 20, when the load sensing pressure PLS sensed by the load sensing pressure sensor 60 is greater than a reference load sensing pressure, and a supplied flow sensed by the supply flow sensor 70 is less than a first reference flow.

According to the present disclosure, by supplementing the flow to the steering unit through operating an auxiliary pump when the flow to the steering unit is deficient, the steering wheel may be prevented from becoming heavy, even when engine rpm is in a low range, to thereby improve controllability of the steering wheel.

Also, by stopping the operating of the auxiliary pump when it is determined that the flow supplied to the steering unit is excessive, energy loss may be minimized.

DETAILED DESCRIPTION

Hereinafter, a hydraulic system for construction machinery according to an exemplary embodiment of the present disclosure will be described in detail.

Figure 1:
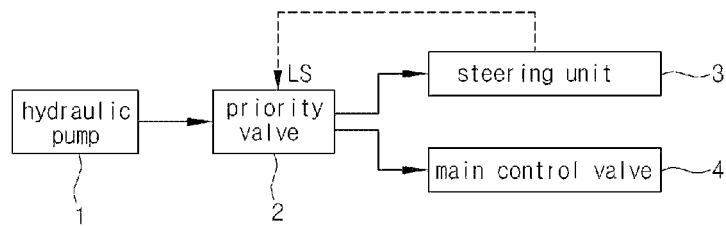
FIG. 1 is a schematic block diagram of a common hydraulic system for construction machinery according to the related art.
Figure 2:
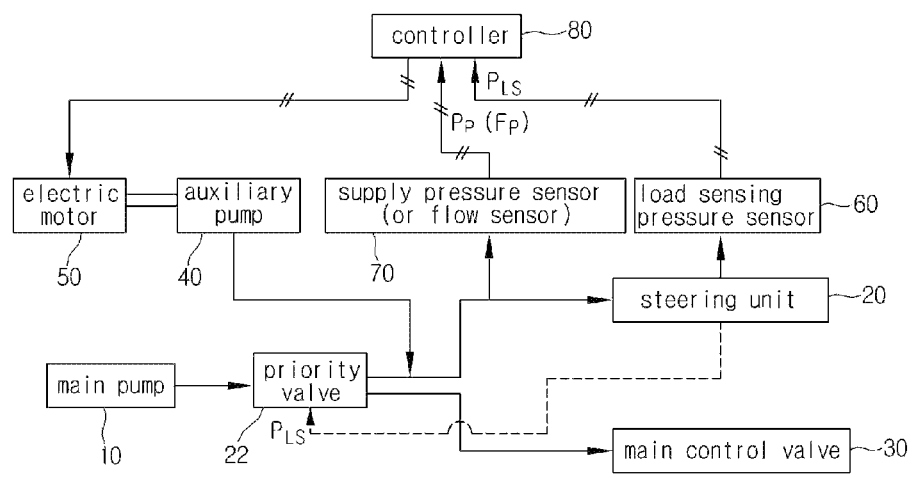
FIG. 2 is a schematic block diagram of a hydraulic system for construction machinery according to an exemplary embodiment of the present disclosure.

Referring to FIG. 2, a hydraulic system for construction machinery according to an exemplary embodiment of the present disclosure is applied to construction machinery in which working fluid discharged from a main pump 10 is simultaneously supplied to a steering unit 20 and a main control valve 30, and which includes an auxiliary pump 40, an electric motor 50, a load sensing pressure sensor 60, a supply pressure sensor 70, and a controller 80.

The auxiliary pump 40 is for supplementing working fluid when the flow of working fluid supplied to the steering unit 20 is deficient, and may have a smaller capacity than the main pump 10.

The electric motor 50 is for operating the auxiliary pump 40, and is directly coupled to the auxiliary pump 40. The rpm of the electric motor 50 and whether the electric motor 50 is rotated is determined by a control signal output from the controller 80.

The load sensing pressure sensor 60 is for sensing a load sensing pressure PLS of the steering unit 20, and the load sensing pressure PLS sensed by the load sensing pressure sensor 60 is proportional to the load on the steering unit 20. That is, the load sensing pressure PLS is proportional to the rotating speed and the rotating amount of the steering wheel. Of course, when no input is made on the steering wheel, the load sensing pressure PLS is in a minimal state.

The supply pressure sensor 70 is for sensing the pressure of working fluid that is discharged from the main pump 10 and supplied to the steering unit 20. When the pressure sensed by the supply pressure sensor 70 is high, this means that a flow that is greater than the flow required by the steering unit 20 is being supplied to the steering unit 20, and when the pressure sensed by the supply pressure sensor 70 is low, this means that a flow that is less than the flow required by the steering unit 20 is being supplied to the steering unit 20.

The above-described supply pressure sensor may be substituted by a flow sensor 70 corresponding to the structure, etc. of equipment. In this case, a quicker reponse may be made rather than undergoing a complicated process of measuring pressure and calculating flow. That is, the flow sensor 70 may directly measure the flow supplied to the steering unit 20, and as described below, this measured flow is used to check whether the flow supplied to the steering unit 20 is sufficient by comparing the measured flow to a preset reference flow.

The controller 80 is for controlling the electric motor 50 when the flow to the steering unit 20 is deficient, to supplement the flow to the steering unit 20 through the auxiliary pump 40. A detailed description of the controller 80 will be provided below in the description of the operation of the hydraulic system.

Hereinafter, a description will be provided on the operation of a hydraulic system for construction machinery having the above-described structure.

Figure 3:
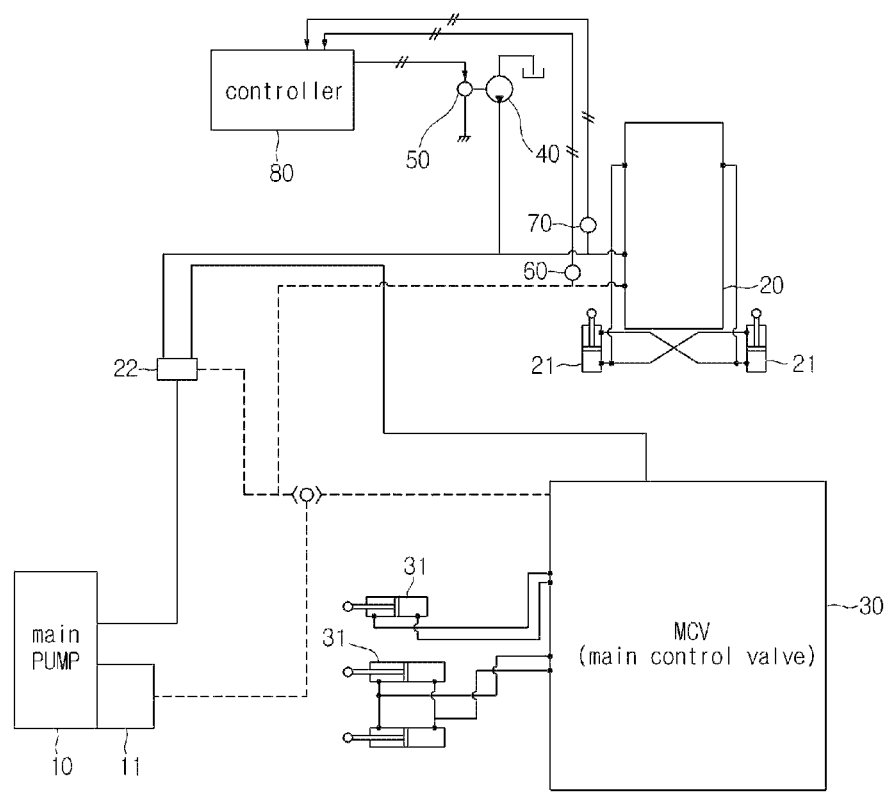
FIG. 3 is a hydraulic circuit diagram of the hydraulic system shown in FIG. 2.
Figure 4:
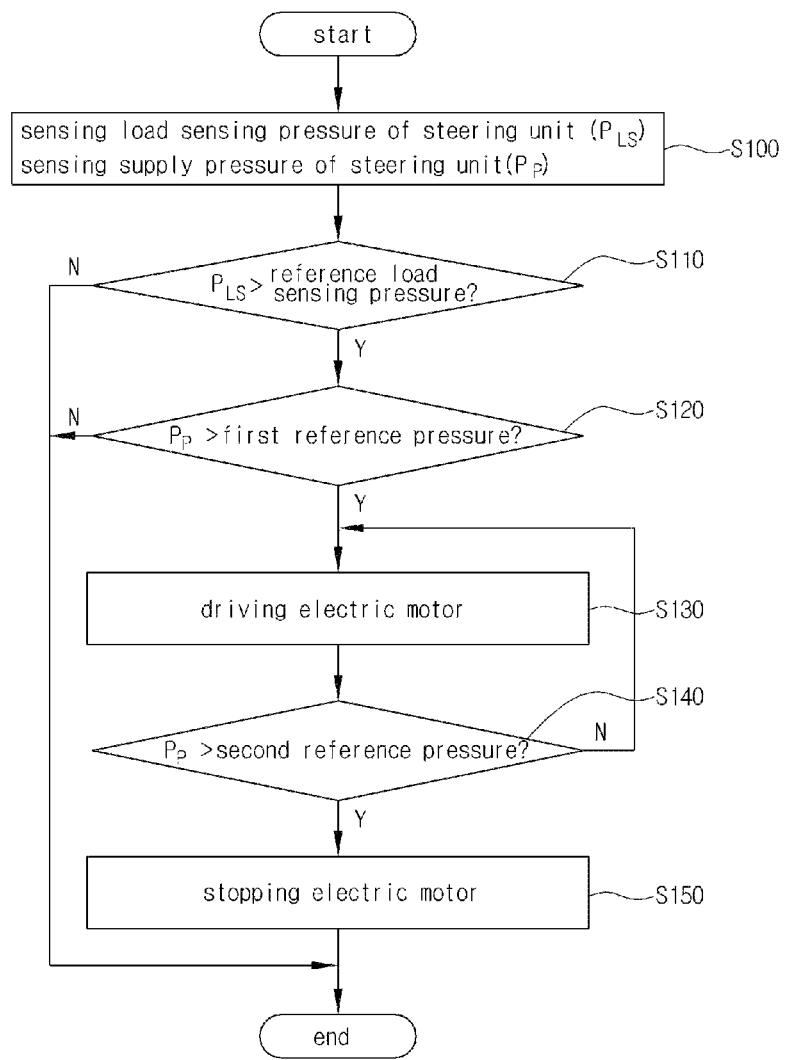
FIG. 4 is a schematic flowchart of an operating process of the hydraulic system shown in FIG. 2.

Referring to FIGS. 3 and 4, working fluid discharged from the main pump 10 is first supplied to the steering unit 20 by means of the priority valve 22, and is then supplied to the main control valve 30. The working fluid supplied to the steering unit 20 is controlled in flow direction and supplied to a steering cylinder 21, and the working fluid supplied to the main control valve 30 is controlled in flow direction and supplied to each actuator 31. A load sensing pressure of the main control valve 30 and the steering unit 20 is supplied to a regulator 11 of the main pump 10 and is used as a signal pressure for controlling the discharged flow from the main pump 10.

Also, in step S100, a load sensing pressure PLS of the steering unit 20 sensed by the load sensing pressure sensor 60, and a supplied pressure PP of working fluid supplied to the steering unit 20 sensed by the supply pressure sensor 70 are transmitted to the controller 80. Then, the controller 80 compares the load sensing pressure PLS to a reference load sensing pressure in step S110.

When the load sensing pressure PLS is less than the reference load sensing pressure, the controller 80 determines that there is no load on the steering unit 20, and does not operate the electric motor 50.

When the load sensing pressure PLS is greater than the reference load sensing pressure, the controller 80 determines that there is a load on the steering unit 20, and compares the supplied pressure PP of the working fluid supplied to the steering unit 20 to a first reference pressure in step S120. If the comparison results show that the supplied pressure PP is greater than the first reference pressure, the controller 80 determines that a sufficient flow is being supplied to the steering unit 20, and does not operate the electric motor 50. Conversely, if the supplied pressure PP is less than the first reference pressure, the controller 80 determines that a deficient flow is being supplied to the steering unit 20, and operates the electric motor 50 in step S130. Then, the auxiliary pump 40 supplements the flow of working fluid to the steering unit 20.

Specifically, when the load sensing pressure PLS is greater than the reference load sensing pressure and the supplied pressure PP is less than the first reference pressure, the controller 80 determines that the flow supplied to the steering unit 20 is deficient and supplements the flow to the steering unit 20 through the auxiliary pump 40.

After operating the electric motor 50, the controller 80 determines in step S140 whether the supplied pressure PP is greater than a second reference pressure. Here, the second reference pressure is greater than the first reference pressure. When the supplied pressure PP is greater than the second reference pressure, the controller 80 determines that excessive flow is being supplied to the steering unit 20, and stops the operation of the electric motor 50 in step S 150 to stop supplementing the flow by means of the auxiliary pump 40.

Figure 5:
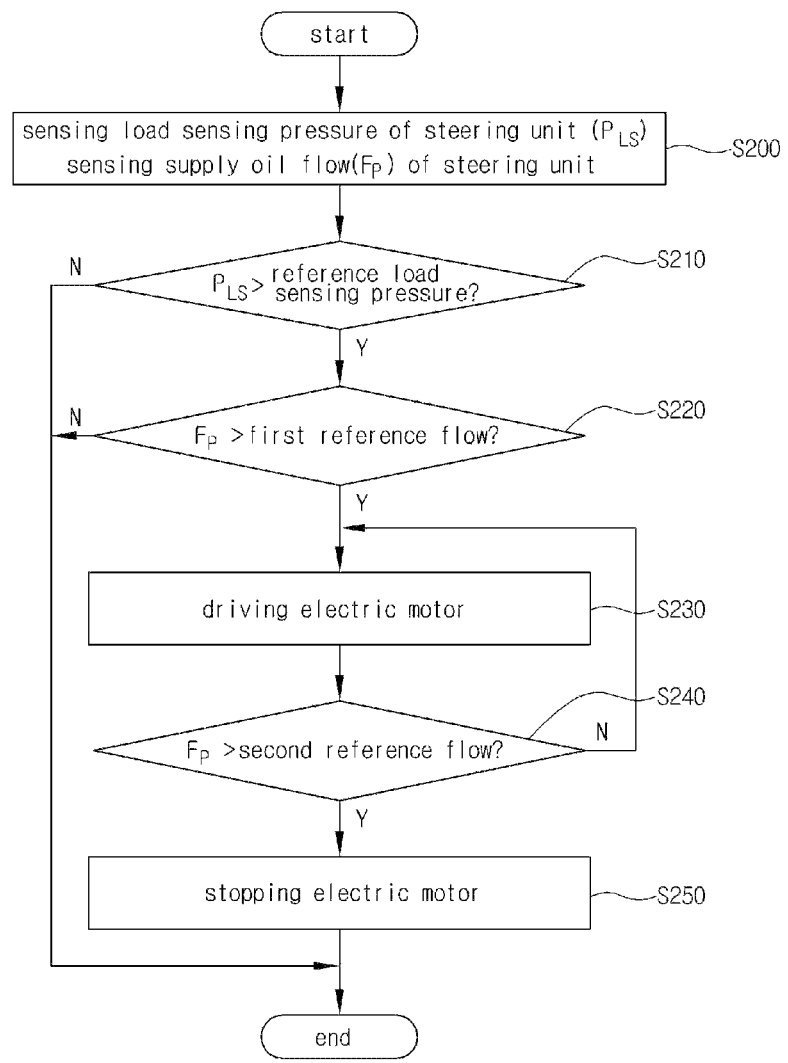
FIG. 5 is a schematic flowchart of the operating process of a hydraulic system according to another exemplary embodiment of the present disclosure.

Exemplary embodiments of the present disclosure have been described above including an installed supply pressure sensor. The supply pressure sensor may be substituted with a supply flow sensor as described above. In this case, as shown in steps S200 to S250 in FIG. 5, the controller 80 receives an input of the flow supplied to the steering unit 20 from the supply flow sensor 70, compares the input flow to a first and a second reference flow, and then determines whether to operate the electric motor 50. The process of the comparing with the first and the second reference flow is similar to the comparing of the measured supplied pressure with the first and the second reference pressures as described above, and a detailed description thereof will not be provided.

As described above, by supplementing the flow of working fluid to the steering unit 20 through the auxiliary pump 40 when the flow to the steering unit 20 is deficient, the steering wheel may be prevented from becoming heavy, even when engine rpm is in a low range, and when excessive flow is supplied to the steering unit 20, the operation of the electric motor 50 may be stopped to minimize energy loss.

The invention claimed is:

1. A hydraulic system for construction machinery having a steering unit for controlling steering of equipment, and a main control valve for controlling operating of a work tool, the hydraulic system comprising:
a main pump configured to discharge working fluid supplied to the steering unit and the main control valve;
a load sensing pressure sensor configured to sense a load sensing pressure of the steering unit;
a priority valve installed in a supply passage for the working fluid discharged from the main pump, configured to divide and supply the working fluid discharged from the main pump to the steering unit and the main control valve, to correspond to the load sensing pressure;
an auxiliary pump configured to supplement working fluid to the supply passage supplying the working fluid divided by the priority valve to the steering unit;
an electric motor configured to operate the auxiliary pump;
a controller configured to:
operate the electric motor when the load sensing pressure is greater than a reference load sensing pressure; and
supply working fluid discharged from the auxiliary pump to the steering unit; and
a supply flow sensor configured to sense a supplied flow that is a flow of working fluid discharged from the main pump and supplied to the steering unit, wherein the controller operates the electric motor when the load sensing pressure is greater than a reference load sensing pressure and the supplied flow is less than a preset first reference flow.

2. The hydraulic system of claim 1, further comprising:
a supply pressure sensor configured to sense a supplied pressure that is a pressure of working fluid discharged from the main pump and supplied to the steering unit, wherein the controller operates the electric motor, when the load sensing pressure is greater than the reference load sensing pressure; and the supplied pressure is less than a preset first reference pressure.

3. The hydraulic system of claim 2, wherein the controller stops operation of the electric motor, when a supplied pressure ($P_P$) sensed by the supply pressure sensor exceeds a second reference pressure that is greater than the first reference pressure.

4. The hydraulic system of claim 1, wherein the controller stops operation of the electric motor, when a supplied flow sensed by the supply flow sensor exceeds a second reference flow that is greater than the first reference flow.

5. A hydraulic system for construction machinery, supplying working fluid discharged from a main pump to a steering unit and a main control valve, the hydraulic system comprising:
an auxiliary pump configured to supplement working fluid to the steering unit;
an electric motor configured to operate the auxiliary pump;
a load sensing pressure sensor configured to sense a load sensing pressure ($P_{LS}$) of the steering unit;
a supply pressure sensor configured to sense pressure of working fluid discharged from the main pump and supplied to the steering unit;
a controller configured to operate the electric motor such that the auxiliary pump supplements working fluid to the steering unit, when the load sensing pressure ($P_{LS}$) sensed by the load sensing pressure sensor is greater than a reference load sensing pressure, and a supplied pressure ($P_P$) sensed by the supply pressure sensor is less than a first reference pressure; and
a supply flow sensor configured to sense a supplied flow that is a flow of working fluid discharged from the main pump and supplied to the steering unit, wherein the controller operates the electric motor when the load sensing pressure is greater than a reference load sensing pressure, and the supplied flow is less than a preset first reference flow.

6. The hydraulic system of claim 5, wherein the controller stops operation of the electric motor, when the supplied pressure ($P_P$) sensed by the supply pressure sensor exceeds a second reference pressure that is greater than the first reference pressure.

7. A hydraulic system for construction machinery, for supplying working fluid discharged from a main pump to a steering unit and a main control valve, the hydraulic system comprising:
an auxiliary pump configured to supplement working fluid to the steering unit;
an electric motor configured to operate the auxiliary pump;
a load sensing pressure sensor configured to sense a load sensing pressure ($P_{LS}$) of the steering unit;
a supply flow sensor configured to sense a flow of working fluid discharged from the main pump and supplied to the steering unit; and
a controller configured to operate the electric motor such that the auxiliary pump supplements working fluid to the steering unit, when the load sensing pressure ($P_{LS}$) sensed by the load sensing pressure sensor is greater than a reference load sensing pressure, and a supplied flow sensed by the supply flow sensor is less than a first reference flow.

8. The hydraulic system of claim 7, wherein the controller stops operation of the electric motor, when a supplied flow ($P_P$) sensed by the supply flow sensor exceeds a second reference flow that is greater than the first reference flow.

* * * * *